United States Patent [19]
Muir et al.

[11] 3,719,924
[45] March 6, 1973

[54] ANTI-ALIASING OF SPATIAL FREQUENCIES BY GEOPHONE AND SOURCE PLACEMENT

[75] Inventors: Francis Muir, Huntington Beach; Jerry L. Morrison, Hacienda Heights, both of Calif.

[73] Assignee: Chevron Research Company, San Francisco, Calif.

[22] Filed: Sept. 3, 1971

[21] Appl. No.: 177,723

[52] U.S. Cl..............................340/15.5 AG, 340/15.5 CP, 340/15.5 MC
[51] Int. Cl. ............................G01v 1/16, G01v 1/28
[58] Field of Search.340/15.5 CP, 15.5 MC, 15.5 AP

[56] References Cited

UNITED STATES PATENTS

| | | | |
|---|---|---|---|
| 3,400,783 | 9/1968 | Lee | 340/15.5 |
| 3,096,846 | 7/1963 | Savit et al. | 340/15.5 |
| 3,400,783 | 9/1968 | Lee | 181/.5 |

OTHER PUBLICATIONS

Schoenberger, "Optimization and Implementation of Marine Seismic Arrays," 12/70, pg., 1038–1053 Geophysics, Vol. XXXV, No. 6.

Primary Examiner—Samuel Feinberg
Assistant Examiner—N. Moskowitz
Attorney—J. A. Buchanan, G. F. Magdeburger, R. L. Freeland, Jr. and H. D. Messner

[57] ABSTRACT

In the generation, recording, and processing of seismic wave data, coherent noise waves of higher spatial frequencies (shorter wave lengths) than those in the desired and useful spatial frequency pass band tend to "alias" down into the desired pass band and to produce interfering effects. This disclosure tells how improved arrays of sources and receivers may be designed and used that, instead of attempting to suppress all spatial frequencies higher than those in the desired pass band, suppress preferentially only those particular, higher spatial frequencies that would alias back into the desired pass band.

16 Claims, 13 Drawing Figures

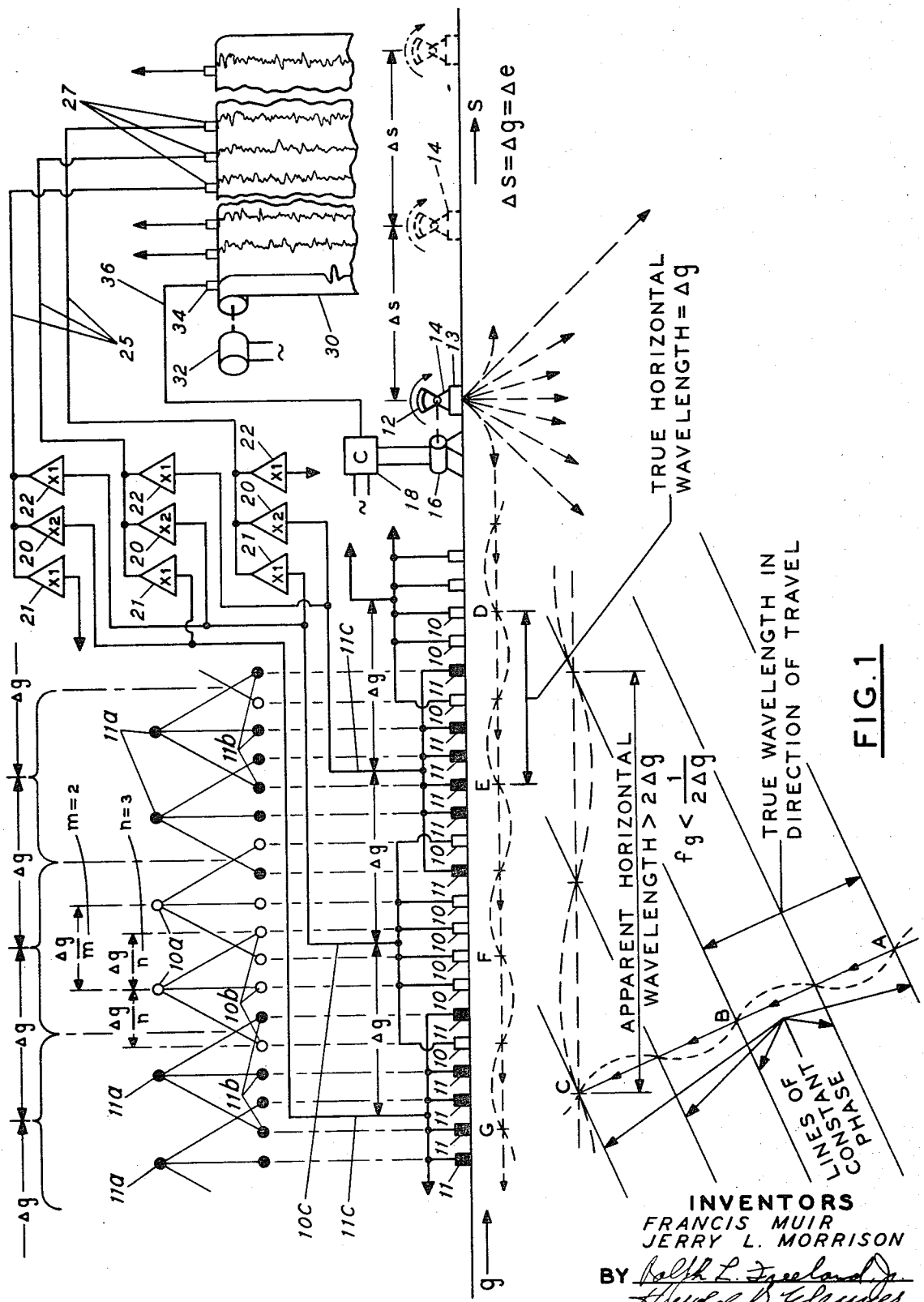

3,719,924

ANTI-ALIASING OF SPATIAL FREQUENCIES BY GEOPHONE AND SOURCE PLACEMENT

FIELD OF THE INVENTION

The present invention pertains to the generation, recording, and processing of seismic wave data for seismic exploration purposes. More specifically it pertains to the improved design of source arrays and receiver arrays, and to improved ways of compositing the received signals so as to suppress undesired, interfering, alias energy.

STATE OF THE ART

In seismic prospecting, elastic waves are created at or adjacent to the surface of the earth by several conventional means. Portions of these elastic waves are transmitted downwardly through the earth and are reflected back to the earth's surface from the interfaces of subsurface strata. These reflected waves are detected by placing geophones on or adjacent to the surface of the earth at points displaced from the origin of the seismic energy. The geophones convert the detected waves to equivalent electrical signals which are then amplified and recorded in a form known as a seismogram or seismic record. The usual seismic record consists of a plurality of amplitude versus time traces aligned in parallel, each representative of the electrical output of a geophone (or group of geophones) at a known geographic location.

In addition to the aforementioned downwardly transmitted elastic waves, most seismic sources generate a variety of other types of elastic waves including, but not limited to, direct air waves and surface waves, which are collectively classified as source-generated coherent noise waves. These coherent noise waves will typically have relatively lower horizontal components of velocity (higher moveouts) as measured on a seismogram, than the reflections from the interfaces of deep subsurface strata.

In the prior art, one means of attenuating the undesirable coherent noise waves has been to use arrays or groups, of sources, and arrays of detectors, instead of a single source and single detectors. Within this specification the term "geophone group" will be used to identify a collection of detectors which are electrically connected in series either actually or effectively, so that a single trace is recorded corresponding to the group and is equivalent to the summed outputs of the individual detectors in the group. The location of the geophone group is specified by the location, with respect to some fixed coordinate system, of a single point associated with the geophone array, and called the geophone group center. In practice the detectors within a group are usually located symmetrically about the geophone group center. The term "source group" will be used to identify a collection of sources, either explosive or mechanical, which are activated simultaneously, or sequentially, to produce a single seismogram. If the sources within the source group are activated sequentially, the resulting traces are later combined in such a way that the final seismogram is essentially equivalent to the seismogram that would have been produced had all of the sources within the group been activated simultaneously. The location of the source group is specified by the location of a single point associated with the source group and called the source group center. In practice the sources in a source group are usually located symmetrically about the source group center.

In addition to the terms defined above we shall have occasion to refer to the concept of "record time." Within this specification the term "record time" will be used to identify the elapsed time after the instant of activation of the source. It is conventional practice to record on a single seismic record the outputs from 24 or more geophone groups whose geophone group centers are spaced over distances up to 7,000 feet from the source array center. The seismic record also generally includes an additional trace showing the instant at which the seismic source array was activated, generally referred to as a "time break" trace, and one or more constant frequency timing signals which may be correlated with the recorded information on the seismic traces to determine the elapsed time from the instant of source activation. The elapsed time to the appearance of some event on the seismogram is the record time of that event. The record times of an event will in general be different on two different traces of the same seismogram.

To obtain a single seismogram there are two methods in common use. In the first method, usually referred to as "end-on" recording, the geophone group centers are located at equal intervals, called the geophone group interval, along an approximately straight line on or near the surface of the earth. The source group center is located on the same straight line but lies at some offset, normally equal to an integral multiple of the geophone group interval, beyond one or the other of the two end geophone group centers. That is, all of the geophone group centers lie on one side of the source group center. In the other method, usually referred to as "split-spread" recording, the geophone group centers are symmetrically located about the source group center. The spacing between adjacent geophone group centers is again uniform and is again referred to as the geophone group interval. The source group center is usually located at the mid-point of the gap separating two sets of geophone arrays. If the gap, which is normally an integral multiple of the geophone group interval, is larger than one geophone group interval, the layout is referred to as a gapped split spread.

The two methods described above for obtaining seismograms are both approximate realizations of an idealized theoretical method in which there would be an infinite number of geophone group centers, equally spaced and lying on a straight line. In this theoretical method the source group center could be located anywhere on the same straight line as the geophone group centers, but normally it would be located at the same location as one of the geophone group centers or midway between two adjacent geophone group centers.

The above paragraphs have mentioned many of the essential elements of the seismic exploration method, and some of its undesirable concomitants, such as the coherent noise waves. There is a considerable literature, in both technical journals and patents, on these coherent noise waves, and how their effects may be suppressed. Much of that literature is relevant in a general way to the method of the present invention. Much of it has been concerned with the purposeful design of geophone arrays to eliminate known, or suspected, frequency bands of coherent noise waves. Therefore, it is important to point out that although the method of the present invention does use geophone array designs, the resulting arrays are not merely improved solutions to the previously discussed problems, but, in fact, the particular problem itself that they solve has not been recognized and described in a manner that would lead toward the present invention. That problem, which will be described much more completely in the following specification, is briefly, that the spacing of the geophone groups themselves causes particular importance to become attached to a particular plurality of narrow frequency bands in the spatial frequency spectrum of the coherent noise waves. The solution to the problem is not given by the literature solutions of designing geophone arrays that merely give lowered peak heights in the spatial frequency pass bands of their geophone group-response-versus-spatial-frequency functions. The solution to the problem is the new one of insuring that entire pluralities of the valleys (the zeros) of the geophone group response function coincide as exactly as possible with the pluralities of the most troublesome bands in the spatial frequency spectrum of the coherent noise waves.

An interesting sidelight on the problem recognized and solved by the present invention is that it is mathematically provable that the problem cannot actually be shown to exist by any type of examination of field records, until it has been solved. Then, the new records may be compared with the previous records to demonstrate that the problem existed. Two figures (FIGS. 8 and 9) attached to the present specification illustrate such a comparison.

To substantiate the above points as well as to provide desirable references as background for the understanding and appreciation of the present invention, the most relevant technical articles and patents known to the present inventors will be briefly mentioned here:

1949, June: C. G. Dahm. U. S. Pat. No. 2,473,469. The Dahm patent is relevant to the present invention only in the specific sense that it describes a method of combined geophone placement and temporal filtering that would substantially eliminate particular seismic waves having individually specified horizontal wavelengths. The Dahm method would not be practicable in modern field practice.

1952, January: A. Wolf. U. S. Pat. No. 2,580,636. Wolf's teachings, including his figures, are relevant to the present invention because they show field mixing of signals from pluralities of geophone groups, which are in turn composed of pluralities of individual geophones.

1955, January: J. O. Parr. U. S. Pat. No. 2,698,927. Parr teaches combining the outputs of pluralities of geophones, and also pluralities of sources, using variable weighting. In some embodiments of the present invention the outputs of pluralities of whole groups of geophones, and whole groups of sources, are combined using binomial weighting. Parr teaches that binomial weighting itself was already prior art as of his filing date of July 1953.

1955, July: J. O. Parr, Jr. and W. H. Mayne. "A New Method of Pattern Shotting." Geophysics, XX, No. 3, pp. 539–564. Parr and Mayne teach that undesirable energy could be eliminated by purposeful regulation of source and detector patterns. However, their teaching concerns a single "broad continuous band of disturbing wavelengths." They talked to terms of "maximum relative effect," which referred to maximum peak values of the geophone (or source) group response function in the frequency band in question. They did not discuss the valleys between the multiple peak values of the geophone (or source) group response functions, nor suggest any possible usefulness of regulating the placement of those valleys.

1956, April: M. K. Smith. "Noise Analysis and Multiple Seismometer Theory." Geophysics, XXI, No. 2, pp. 337–360. Smith's article is, at least mathematically, the most erudite treatment of the subject. Smith's treatment is "based on the theory of Generalized Harmonic Analysis" developed by Norbert Wiener and his associates. According to Smith, his theory is so general that "initially [it requires] no restrictive assumptions as to the nature of the signal or the noise." At no point does Smith suggest the existence of the particular problem treated in the present invention, and he makes no mention of the purposeful placement of the valleys of the geophone (or source) group response functions or any possible usefulness of those valleys.

1958, January: C. H. Savit, J. T. Brustad, and J. Sider. "The Moveout Filter." Geophysics, XXIII, No. 1, pp. 1–25. Savit et al clarified some of the concepts of the previous authors. They made very clear the concept of "spatial frequency." They taught that "it is desirable to incorporate within a seismograph system a low pass moveout filter. Such a filter will pass low moveouts, that is, low values of spatial frequency, and reject the higher moveouts." They made very clear the generally expectable shape of the geophone (or source) group-response-versus-spatial-frequency function. They taught the concept of a "meta-array of identical arrays" which is used in the present invention (although not by that name) and they taught that such an array would "have a response curve equal to the product of the response curve of the typical [component] array by the response curve of the meta-array considered as a simple array." However, like the other mentioned authors, they taught, and they even taught explicitly "that substantially equal importance is attached to noise of all spatial frequencies within the range of investigation." It is precisely because this teaching does not represent seismic reality that the problem solved by the present invention arises.

July, 1963: U. S. Pat. No. 3,096,846 was filed in December 1958 with the same three, above-mentioned authors named as the inventors. The teachings of the patent specification are essentially the same as those of the article. It should be especially noted here that in the specification occurs the phrase ". . .a least squares best fit to, . . .zero response over the range of noise moveouts." This should not be confused with the actual zero responses at selected frequencies that are taught in the present specification.

1968, September: E. K. Lee. U. S. Pat. No. 3,400,783. To the knowledge of the present inventors, this is the patent most closely related to the present invention. It deals with purposeful geophone placement to filter out waves of higher spatial frequencies, but it is like the above-mentioned technical literature references in its treatment of a broad band of higher spatial frequencies, and it gives no recognition whatsoever to the possible use of purposefully placed valleys of geophone group response functions. In fact, in the Figures of Lee, the valleys, which on his logarithmic, decibel plots should extend to minus infinity, are filled in; and the fact that they should actually be "zeros" is disregarded in the graphical approximations.

1969, March: J. P. Lindsey. U. S. Pat. No. 3,432,807. Lindsey's teachings show, as of this relatively late date, the continuing effort to use "filtering and combining" of the signals from geophone groups in the attempt to eliminate the entire upper band of spatial frequencies (Lindsey uses the term "wave numbers") above a preselected value.

1969, September: R. O. Lindseth, H. J. Hoogstraat, and K. H. Tseng. "Application of the Two-Dimensional Fourier Transforms to Enhancement of Seismic Data." Presented to the Society of Exploration Geophysicists, Calgary, Canada. These authors mention the theoretically necessary existence of an aliasing phenomenon when spacing of geophone groups is not fine enough adequately to sample the shortest horizontal wavelengths traveling in the earth's surface. They give no indication that it is a significant present field problem and suggest only that "closer trace spacing in the field will limit the aliasing problem." Close enough geophone group spacing to produce results comparable to those produced by the present invention would not be practicable.

1970, January: R. O. Lindseth. "Recent Advances in Digital Processing of Geophysical Data." CDP Computer Data Processors Ltd. 1370 Calgary House. 550 6th Ave. S.W., Calgary 1, Alberta, Canada. Lindseth discusses a possible spatial frequency aliasing problem, and mentions what kinds of false dips could appear on a record as results of aliasing, but again, as a solution to the possible problem mentions only that "geophone groupings must be spaced closer together." No hint is given of the possibility of the economically feasible solution provided by the present invention.

1970, December: M. Schoenberger. "Optimization and Implementation of Marine Seismic Arrays." Geophysics, XXXV, No. 6, pp. 1038–1053. Schoenberger treats the problem of designing arrays to reject specified "bands of wavelengths which contain noise." Like the analyses of the predecessors, Parr and Mayne, Savit et al., and Smith, Schoenberger's analyses are concerned with minimizing the peak heights of his array response functions within specified bands of spatial frequencies. There is no hint of the possibility that an important type of record improvement could be achieved by judicious purposeful placement of the valleys (the zeros) of the array response functions.

The above paragraphs have cited what is believed to be the closest prior art to the present invention. The aliasing problem, in spatial frequencies, solved by the present invention, has been mentioned in the technical literature as a theoretical possibility, beginning as early as 1969, but no estimate has been given of the possible actual significance of the problem. As mentioned heretofore, this would hardly have been possible because the effect of the problem on actual field records could not be measured until the problem was solved; and the previously suggested, obvious solution of merely decreasing geophone group spacings enough to solve the problem was not economically and technically feasible.

At this point, the seismic problem of aliasing in the spatial frequency domain will be described verbally. More exact mathematical description is given later in this specification.

The seismic recording process involves the general problem of sampling a continuous function at regular sampling intervals, a problem which arises in many arts. The continuous function in seismic recording is the movement of the earth, or the velocity of that movement, at points along the line of geophone group centers. The regular sampling interval is the geophone group interval. It is intuitively obvious that if the wave being sampled is so long that the distance between any two nodes of the wave covers many of the sampling points, then the sampling will give an excellent idea of the shape of the wave; and as a matter of mathematical fact, it can be shown that under such conditions, the sample data can given an exact mathematical representation of the wave. It is intuitively evident also, that if the wave being sampled is so short that several oscillations of the wave occur between each two sampling points, then only a poor idea of the wave may be obtained. As a matter of mathematical fact, it turns out that the poorness is not utter confusion, it is merely ambiguity. A wave that is being inadequately sampled, by sampling points spaced too far apart, can be mathematically reconstructed from that sampling as being composed of one or more of a set of definite frequencies whose interrelationships depend upon the sampling interval. The ambiguity is in what proportions exist among the waves of those definite frequencies.

The lowest frequency in that set of definite frequencies is one, which if it were present, would be adequately sampled. So, another way of stating the ambiguity is to say that wave energy which actually existed in any one member, or in several members of that set of frequencies, appears as if it were all in the lowest member, which does fall in the adequately sampled frequency range. Still another way of stating this result is to say that any one, or all, of the upper frequencies of the set will "alias" back into the range of properly sampled frequencies, masquerading as the one member of the set that is in the adequately sampled range.

In the present specification, the term "high spatial frequencies" refers to the high apparent spatial frequencies, (in cycles per foot) of the horizontal components of earth waves whose spatial variation is being attempted to be sampled by the geophone groups laid along the surface of the earth. Because it is not technically and economically feasible to sample the earth at close enough points to get unambiguous sampling of all the possible shorter, higher frequency waves, when those waves are present they "alias" down into the adequately sampled frequency band.

One specific manifestation of the seismic aliasing phenomenon can be described in terms of wave arrival directions. Reference may be made here to FIG. 1, in which are shown two waves having the same true wavelength in their own directions of travel, but quite different apparent horizontal wavelengths. The wave coming from a direction close to the vertical has an apparent horizontal wavelength much longer than its actual wavelength. In the example illustrated in FIG. 1, that apparent horizontal wavelength is greater than twice the distance between geophone group centers, and according to the mathematics of sampling, developed in detail later in the present specification, waves as long as twice the distance between geophone group centers, and longer, are quite adequately sampled. On the other hand, the horizontally traveling wave, having the same true wavelength, but whose apparent horizontal wavelength is actually that true wavelength, is not adequately sampled by the represented geophone groups. That wave of too short wavelength, or too high spatial frequency, tends to "alias" down to a lower apparent spatial frequency (dependent on its actual spatial frequency and the geophone group interval). The wave then manifests itself in the obtained seismic record as a false wave of lower spatial frequency, having a false apparent direction of travel closer to the vertical. The recorded evidence of the false apparent wave may then be confused with, or interfere with, the recorded evidence of a true wave coming from that same direction closer to the vertical. The interference may even be so strong as to obscure the true wave beyond recognition.

In verbal terms, this is the seismic aliasing problem in the spatial frequency domain. The present inventors have discovered a solution to the problem that does not require diminution of the geophone group interval below technically and economically reasonable limits. They have found that the geophone spacings within the geophone groups may be related to the geophone group intervals in just such a way that all the particular narrow bands of spatial frequencies that would otherwise alias down into the desired, adequately sampled band of spatial frequencies are particularly eliminated. They are eliminated by the valleys (the "zeros") of the geophone (and source) group-response-versus-spatial frequency functions.

The manner in which the aliasing spatial frequencies are eliminated, and in which other accompanying objectives are achieved, will become evident from the following specification, including the drawings, whose general contents are listed immediately below:

BRIEF DESCRIPTIONS OF THE DRAWINGS

In the drawings,

FIG. 1 is a schematic representation of a seismic exploration system laid out in accordance with the present invention. It shows geophone and source spacings, and indicates how some of the geophone group configurations of the present invention may be derived. It also illustrates some seismic waves, between which the present invention enables discrimination.

DETAILED DESCRIPTION OF PRESENT INVENTION

Figure 2A:
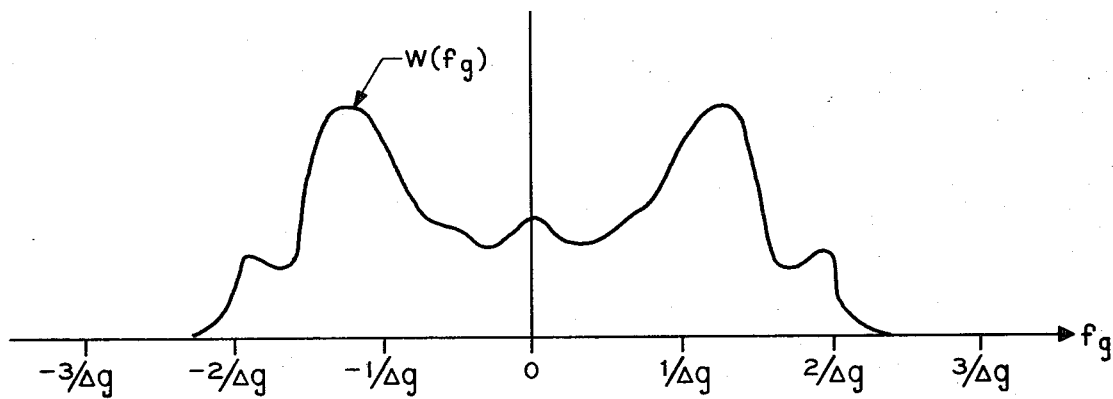
FIG. 2A is a plot of a Fourier transform of a seismic disturbance, component amplitudes being plotted as a function of spatial frequency (1/wavelength). The convenient unit of spatial frequency here is the reciprocal of the geophone group interval.

Referring now to the drawings, FIG. 1 illustrates schematically a seismic exploration system laid out in accordance with the present invention. It shows a plurality of geophone groups spaced from each other and from a seismic source and connection of each geophone group to a field recording system. The arrangement will be described in greater detail further on in this specification. However, at this point, a full discussion of the theoretical background and practical design of such a system to solve the "aliasing" problem referred to above, will help those skilled in the art of seismic exploration to understand better the field and record analysis procedures specifically contemplated by the arrangement of FIG. 1.

Let $g$ be the distance coordinate along the line of geophone placement. If a function $w$ of the independent variable $g$ has a Fourier transform $W(f_g)$, the function $W_s(f_g)$, which is the Fourier transform of the function reconstructed from the sample values of $w(g)$ taken at regular intervals of $\Delta g$, is given by $$W_s(f_g) = \sum_{n=-\infty}^{\infty} W\left(f_g - \frac{n}{\Delta g}\right), \quad |f_g| < \frac{1}{2\Delta g} \quad (1)$$

(See, e.g., Peterson, D.P. and D. Middleton: Information and Control 5:279(1962)). This relationship is illustrated in FIG. 2B. It is apparent from Equation (1) and FIG. 2B that the amplitude of $W_s(f_g)$ for any value of $f_g$ satisfying $|f_g| < \frac{1}{2}\Delta g$ will be determined by the values of $W(f_g)$ at $f_g - n/\Delta g$, $n = 0, \pm 1, \pm 2, \ldots$ The amplitudes $W(f_g - n/\Delta g)$, $n = \pm 1, \pm 2, \ldots$, are said to be aliased back to the spatial frequency $f_g$.

Figure 2B:
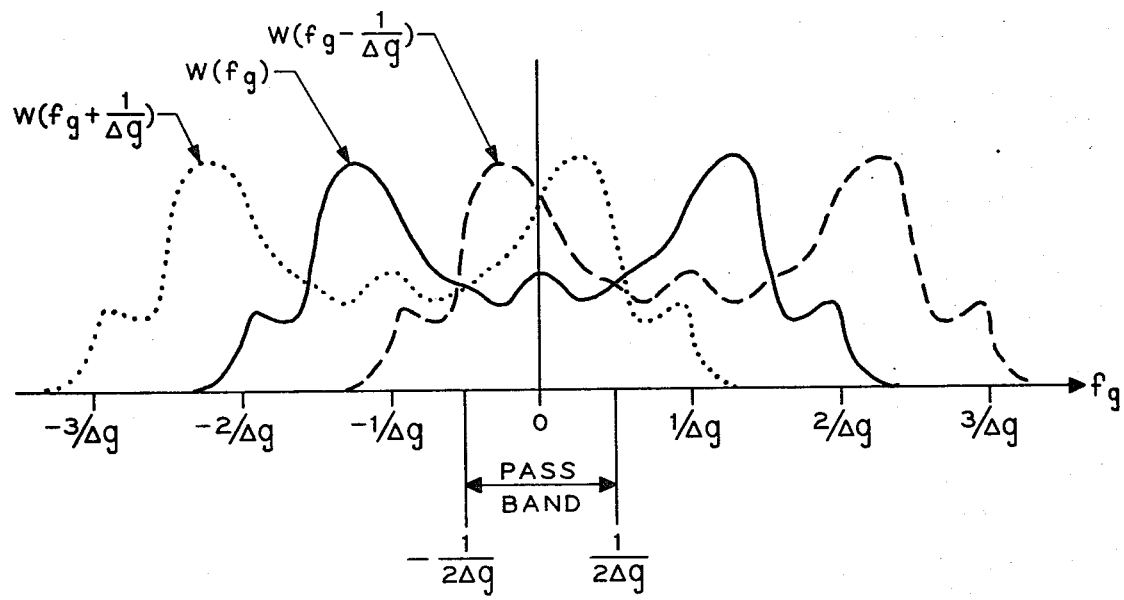
FIG. 2B is a diagram similar to FIG. 2A, showing the effect of discrete sampling on the Fourier transform of the seismic signals.

Within the context of exploration seismology, FIG. 2A might represent the Fourier transform of a seismic disturbance arriving at the seismic survey line at some fixed record time. FIG. 2B then illustrates the effect of sampling at an interval $\Delta g$ on the Fourier transform of the reconstructed seismic disturbance. If we regard the seismic energy in the vicinity of $f_o = O$ as signal and the remainder as noise (in practice, we are usually most interested in the region $f_o < \frac{1}{4}\Delta g$) it is then obvious that the aliasing effects due to energy in the vicinities of spatial frequencies $f_o = n/\Delta g$ will tend to decrease the signal-to-noise ratio for interpolated values of the seismic disturbance.

As previously discussed, the prior art has devised geophone and source arrays (or groups) which attempt to attenuate the energy at spatial frequencies corresponding to the coherent noise waves. The geophone group-response-versus-spatial-frequency function of a symmetric geophone group may be written $$R(f_g) = \left[ \sum_{n=-N}^{N} G_n \cos(2\pi f_g g_n) \right] / \left[ \sum_{n=-N}^{N} G_n \right] \quad (2)$$

where $G_n$ is the sensitivity, or gain, of the $n^{th}$ geophone and $g_n$ is the distance of the $n^{th}$ geophone from the array center (implying $g_o = 0$). The symmetry results from the requirements $G_{-n} = G_n$ and $g_{-n} = g_n$. The number of geophones in the array is $2N$ if $G_o = 0$ and $2N + 1$ otherwise. For brevity we shall frequently refer to $R(f_g)$ as the geophone-group-response function. A function commonly used in exploration seismology to characterize the spatial frequency attenuation properties of a geophone array is the decibel response of the array, defined by $$D(f_o) = 20 \log_{10} |R(f_o)|. \quad (3)$$

Figure 3B:
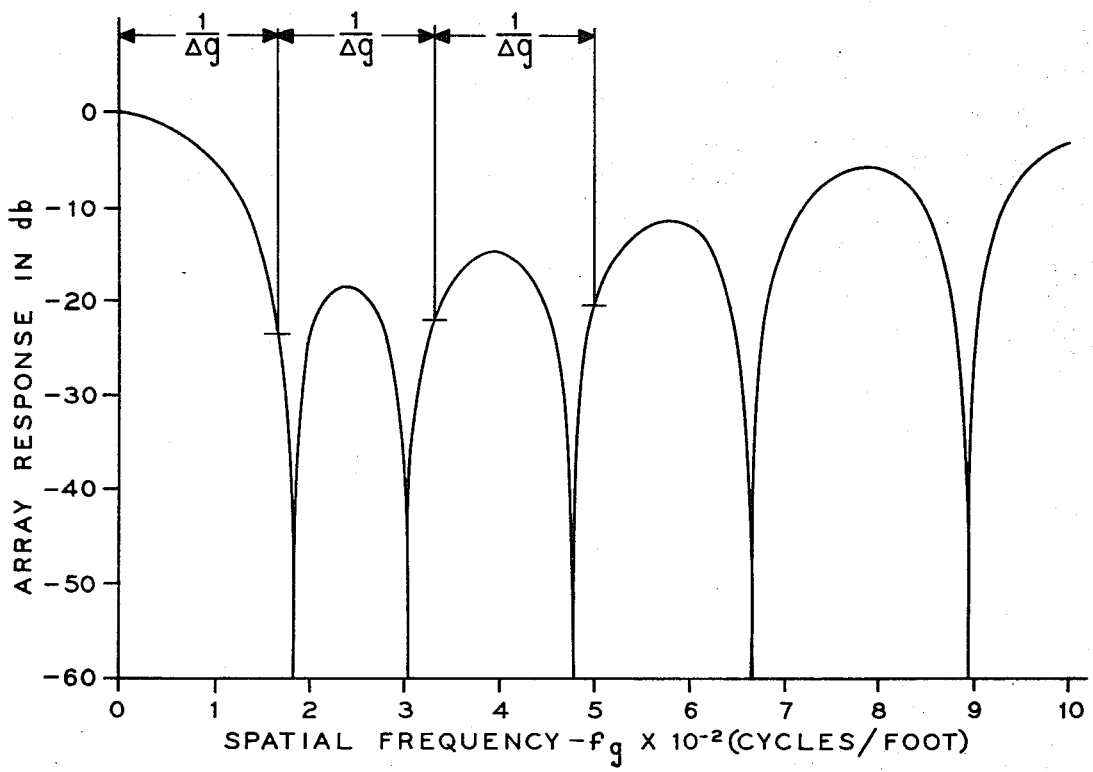
FIG. 3B is a decibel response curve of the configuration of geophones of FIG. 3A.
Figure 3A:
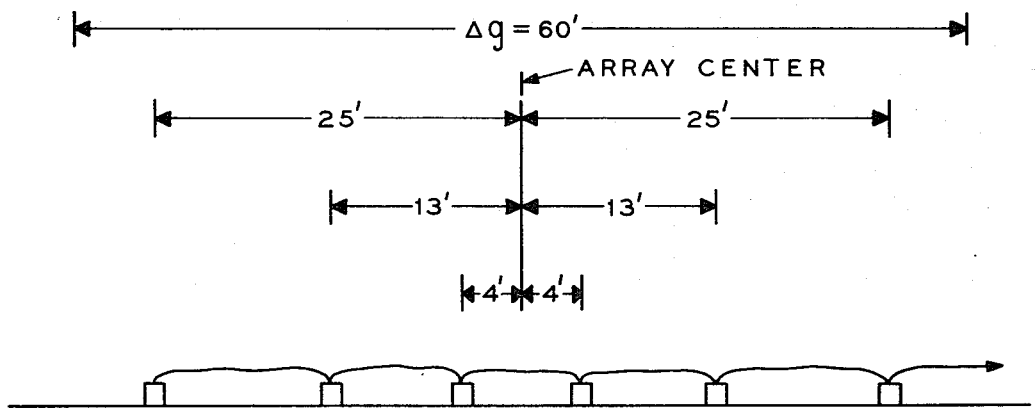
FIG. 3A represents a prior art grouping of geophones called a centroid spaced seismic transducer array.

An example of a simple geophone group from the prior art and its decibel response is shown in FIGS. 3A and 3B, respectively. The group consists of six equally sensitive geophones located with respect to the array center as indicated in FIG. 3A. The array is called a centroid spaced seismic transducer array as described in U. S. Pat. No. 3,400,783 issued to E. K. Lee, et al., on Sept. 10, 1968. Assuming a geophone group interval, $\Delta g$, of 60 ft, the integral multiples of $1/\Delta g$ will occur at the points indicated on the decibel response curve of FIG. 3B. It will be noted that the maximum attenuation at any integral multiple of $1/\Delta g$ is approximately 23 db. It is not uncommon when using surface sources to have coherent noise waves lying 50 db or more above the reflected signal. For example, the 18.4 hz component of an air wave having a velocity of 1,100 ft/sec will have a spatial frequency of $1/\Delta g = 0.0167$ cycles per foot, as calculated by using the equation:
$f_o$(spatial frequency) = $f_t$(temporal frequency)/$V$(velocity). 4.
If the amplitude of this 18.4 hz component is considerably larger than the signal amplitude at the same record time, the aliasing effect of the coherent noise wave can easily obscure the useful information.

Figure 4B:
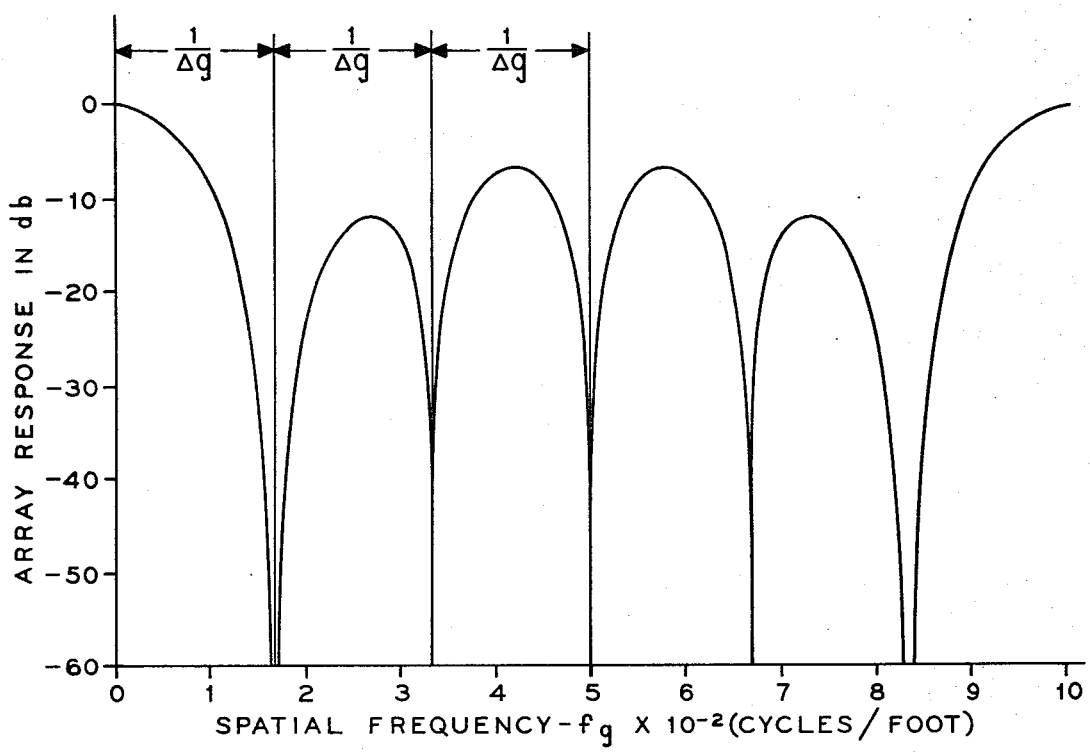
FIG. 4B is a decibel response curve of the array of FIG. 4A. The zeros of the response curve of such an array fall at equal intervals of $1/\Delta g$ in the spatial frequency domain.
Figure 4A:
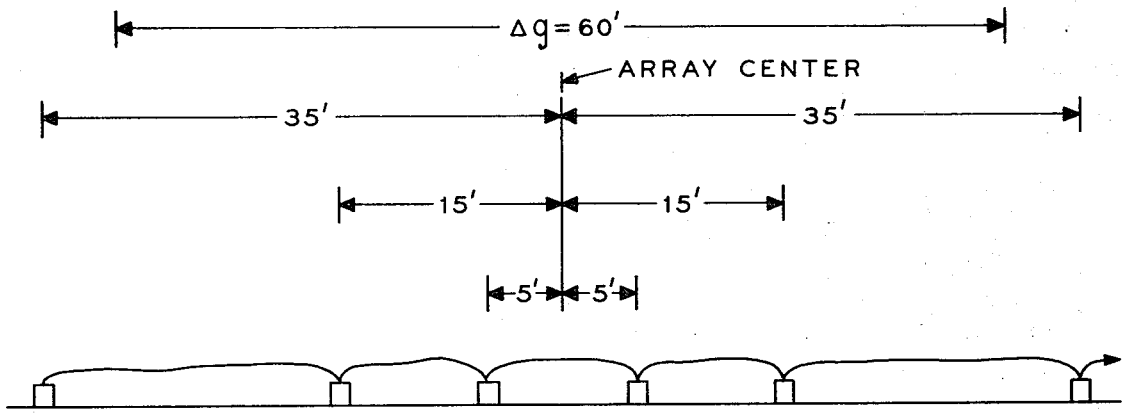
FIG. 4A is an array of seismic geophones in accordance with the present invention.

In FIGS. 4A and 4B are shown an array in accordance with the present invention, and the decibel response of that array, which has better spatial frequency anti-alias features than those in FIG. 3B. The array consists of six equally sensitive geophones located with respect to the group center as shown in FIG. 4A. It is assumed that the group interval, $\Delta g$, is 60 ft. If a different group interval is desired, the element spacings in FIG. 4A must be multiplied by $(\Delta g)$ desired/60. It is apparent from FIG. 4B that the transfer function of the array of FIG. 4A has its zeros equally spaced at intervals of $1/\Delta g$ between the zero- and first-order major lobes. Those spatial frequencies that would give rise to aliasing effects in the neighborhood of zero spatial frequency are completely attenuated. This would not be possible with the array of FIG. 3A since the zeros of its transfer function are not equally spaced.

The array of FIG. 4A is a relatively simple example out of the class of all arrays having transfer functions with equally spaced zeros between the major lobes. With such arrays it is always possible to adjust the element spacing so the zeros of the transfer function will lie at spatial frequencies $n/\Delta g$, $n = \pm 1, \pm 2, \ldots, \pm n_{max}$. The six-element array of FIG. 4A belongs to a sub-class of such arrays which we shall refer to as prime convolutionary arrays. In particular, the array of FIG. 4A is the convolution of two simple arrays having two and three elements, respectively. The two-element array has geophones located at $\{-\Delta g/4, +\Delta g/4\}$ and the three-element array has geophones located at $\{-\Delta g/3, 0, +\Delta g/3\}$, the geophones in both arrays being equally sensitive. The array of FIG. 4A then has geophones at locations given by the convolution of the two simpler arrays. The geophone group-response function of the six-element array will be equal to the product of the geophone group-response functions of the two- and three-element arrays. Thus, at $f_o = \pm 1/\Delta g$, the geophones group-response functions of the two- and three- element arrays are both zero, so the geophone-group-response function of the array in FIG. 4A will have a second-order zero at $f_o = \pm 1/\Delta g$. This is manifested in the normalized decibel response of FIG. 4B as an increased attenuation in the vicinity of $f_o = 1/\Delta g = 0.0167$ cycles/ft.

Prime convolutionary arrays with better attenuation characteristics than the above-mentioned six-element array may be constructed as follows: Denote the array having $m_1$ equally sensitive elements spaced at intervals of $\Delta g/m_1$ by $a_1$. Similarly, denote the array having $m_2$ equally sensitive elements spaced at intervals of $g/m_2$ by $a_2$. The geophone group-response function of the array $a_1$ will be given by $$R_1(f_g) = \frac{1}{m_1} \frac{\sin(\pi f_g \Delta_g)}{\sin\left(\frac{\pi}{m_1} f_g \Delta_g\right)}, \quad (5)$$

which has first-order zeros at $f_o = 1/\Delta g, 2/\Delta g, \ldots, m_1 - 1/\Delta g$ in the interval $0 \leq f_g \leq m_1/g$. The geophone group-response function of the array $a_2$ will be given by $$R_2(f_g) = \frac{1}{m_2} \frac{\sin(\pi f_g \Delta_g)}{\sin\left(\frac{\pi}{m_2} f_g \Delta_g\right)}, \quad (6)$$

which has first-order zeros at $f_o = 1/\Delta g, 2/\Delta g, \ldots, m_2 = 1/\Delta g$ in the interval of $0 \leq f_g \leq m_2/g$. The array formed by convolving $a_1$ with $a_2$ (denoted by $a_1*a_2$) will have a geophone group-response function given by $$R_{12}(f_g) = R_1(f_g) R_2(f_g)$$
$$= \frac{1}{m_1 m_2} \frac{\sin^2(\pi f_g \Delta_g)}{\sin\left(\frac{\pi}{m_1} f_g \Delta_g\right) \sin\left(\frac{\pi}{m_2} f_g \Delta_g\right)} \quad (7)$$

If $m_1 < m_2$ are relatively prime, $R_{12}(f_g)$ will have first-order zeros at $f_g = k_1 m_1/\Delta g$ and $k_2 m_2/\Delta g$, where $k_1 = 1, 2, \ldots, (m_2 - 1)$, and $k_2 = 1, 2, \ldots, (m_1 - 1)$, in the interval $0 \leq f_g \leq m_1 m_2/\Delta g$. All other zeros in this interval will be of second-order. The array in this example will be referred to as $m_1*m_2$ prime convolutionary. It is considered to be important that the early zeros of the geophone group-response function be of second-order or higher in order that the normalized decibel response have good attenuation characteristics in the vicinity of the early integral multiples of $1/\Delta g$.

There exists other types of geophone arrays whose geophone group-response functions have equally spaced zeros, but the prime convolutionary arrays are particularly simple to work with as a result of the fact that the geophone group-response function of a convolutionary array is equal to the product of the geophone group-response functions of the component arrays. This fact is directly attributable to the convolution theorem for Fourier transforms.

As discussed above, and illustrated in FIG. 4B, proper placement of the geophones in an array leads to a high attenuation of those spatial frequencies which give rise to aliasing effects in the vicinity of zero spatial frequency. In addition, there will be aliasing effects in the desired passband due to spatial frequency components lying halfway between the integral multiples of $1/\Delta g$. In FIG. 4B, it is seen that the decibel response of the represented simple six-element array has maxima lying approximately halfway between the integral multiples of $1/\Delta g$.

Figure 5A:
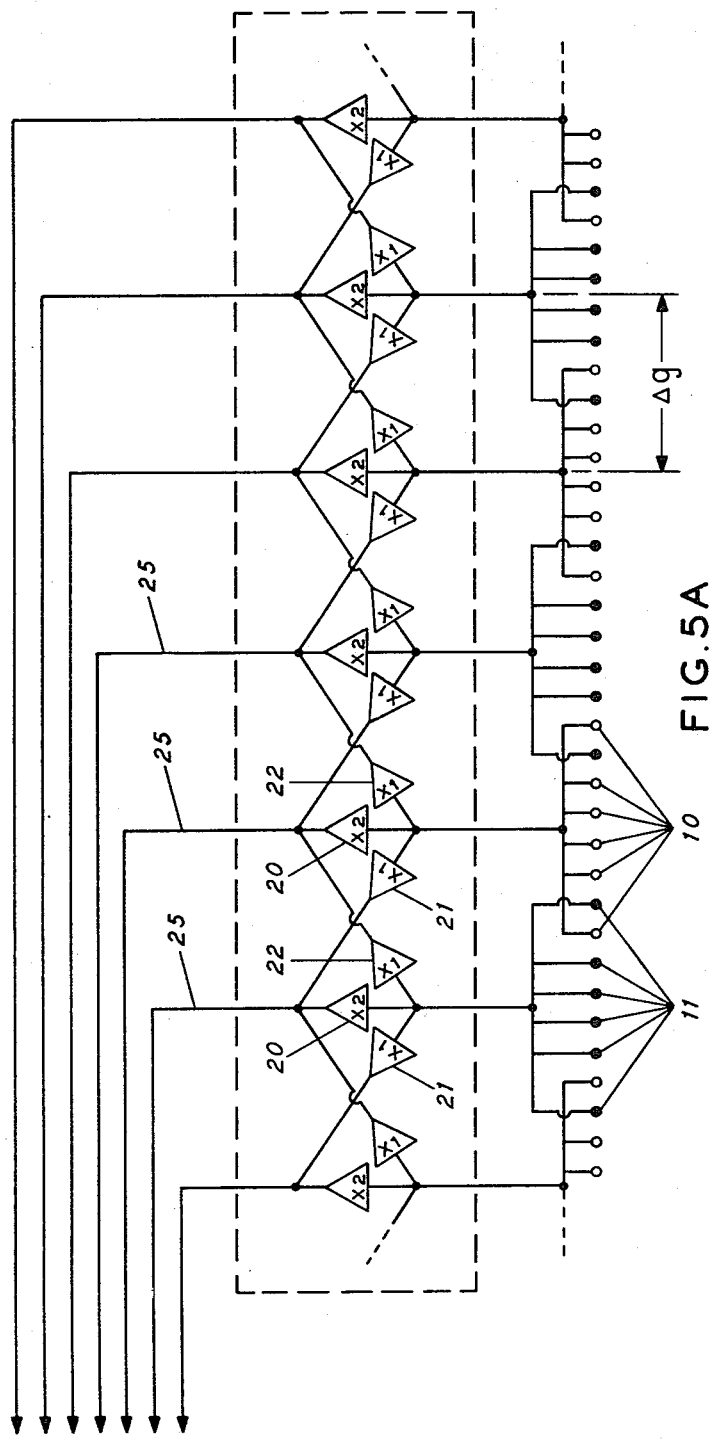
FIG. 5A illustrates one form of mixing of adjacent geophone groups, which have a center-to-center spacing of $\Delta g$.
Figure 6:
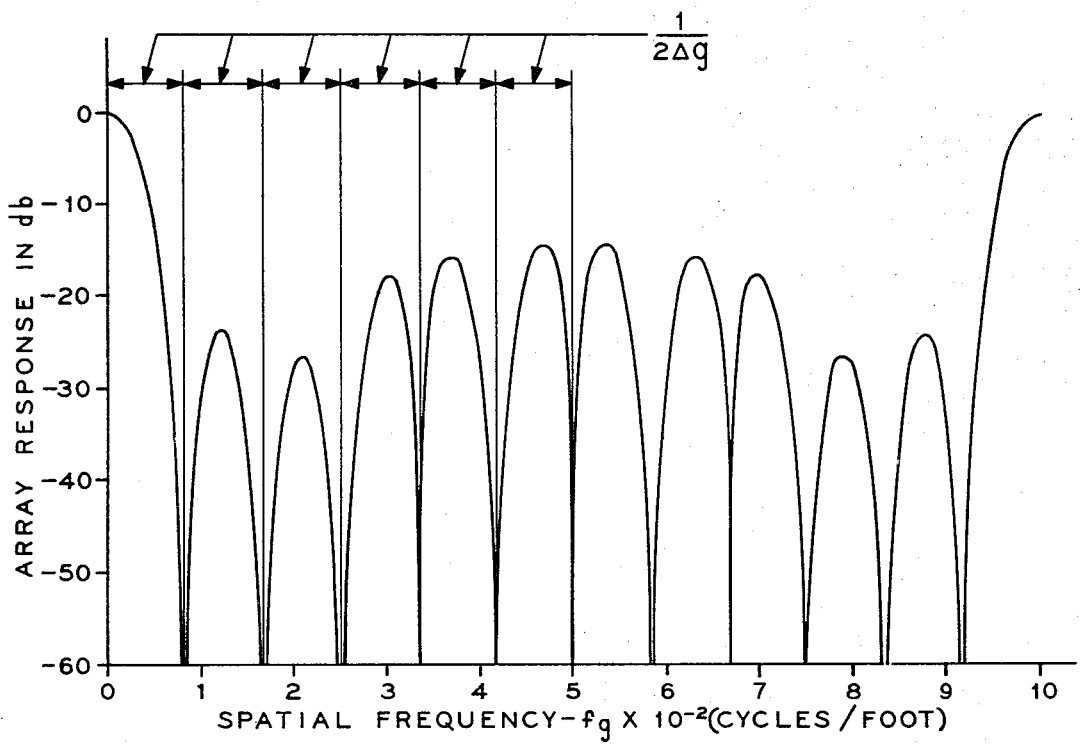
FIG. 6 is a decibel response curve of the array shown in FIG. 5A in which a binomial mix has been used of the adjacent geophone groups, for recording.

It is part of the method of the present invention to further attenuate those spatial frequencies giving rise to aliasing effects in the high portions of the spatial frequency pass-band by combining the outputs of near neighboring geophone groups in an inter-trace mix. An example of a usable mixing arrangement is illustrated in FIG. 5A. The mixing is such that the trace value recorded by the seismic recorder, $T_i(t)$, at record time t is given by $$T_i(t) = T_{i-1}'(t) + 2T_i'(t) + T_{i+1}'(t), \quad 8$$

where $T'_j(t)$ is the output of the $j^{th}$ geophone group at record time $t$ (here $j = i-1, i,$ or $i+1$). The effect of this particular mixer upon the spatial frequency spectrum of the seismogram is to multiply the spectrum by the function $$M(f_g) = \cos^2[\pi f_g \Delta g] \quad (9)$$

which has second-order zeros at $f_g = (2k+1)/2\Delta g$, $k = 0, \pm 1, \pm 2, \ldots$ One may regard the mixer-geophone array combination as being equivalent to a larger geophone array which is a convolution of the actual geophone array with an array of three elements spaced at an interval of $\Delta g$ and having sensitivities in the ratio 1:2:1. The normalized decibel response of the convolution of the six-element array shown in FIG. 4A and the 1:2:1 mixer is shown in FIG. 6.

The 1:2:1 mixer belongs to a general class of mixers whose transfer functions have the property of being equal to zero at all of the odd half-integral multiples of $1/\Delta g$. A particularly useful subset of this general class is the set of mixers such that the recorded trace is given by $$T_i(t) = \sum_{n=0}^{2N} \binom{2N}{n} T'_{i-N+n}(t) \quad (10)$$

where $T'_j$ has the same meaning as in Equation (8) and $$\binom{2N}{n} = \frac{(2N)!}{(n)!(2N-n)!} \quad (11)$$

is a binomial coefficient. The transfer function of this mixer is $$M_{2N}(f_g) = [\cos(\pi f_g \Delta g)]^{2N} \quad (12)$$

which has zeros of order $2N$ at all half-integral multiples of $1/\Delta g$. We refer to such a mixer as a "binomial-mixer."

The mixer contemplated in this specification is a multi-channel passive resistive network into which the outputs of the individual geophone groups are fed, as illustrated in FIG. 5A. The construction of such mixers is already well-known to those skilled in the art of seismic instrumentation. It is known that caution should be exercised in matching the impedance to the impedance of the seismic amplifier, and steps must be taken to minimize "cross-talk" among the input channels. Another method of achieving the desired inter-trace mix is to record the seismic traces, unmixed, and then perform the mixing at some later time during computer processing. We refer to this process as "computer-mixing." "Field-mixing" is the term applied to the process of inter-trace mixing prior to recording of the seismic traces.

In accordance with this invention, it is now possible to design geophone arrays whose geophone-group-response functions are zero at all early half-integral multiples of the reciprocal of the group interval, thus combining the spatial-frequency anti-aliasing features of the geophone arrays and inter-trace mixers discussed up to this point. Illustrative of this general class of geophone arrays is the useful set of arrays constructed as follows: Denote the array having $n_1$ equally sensitive elements spaced at intervals of $2\Delta g/n_1$ by $C_1$. Similarly, denote the array having $n_2$ equally sensitive elements spaced at intervals of $2\Delta g/n_2$ by $C_2$. The geophone-group-response function of array $C_1$ is given by $$R_1(f_g) = \frac{1}{n_1} \frac{\sin(2\pi f_g \Delta g)}{\sin\left(\frac{2\pi}{n_1} f_g \Delta g\right)} \quad (13)$$

which has first-order zeros at $f_g = 1/2\Delta g, 1/\Delta g, \ldots, (n_1-1)/2\Delta g$ in the interval $0 \leq f_g \leq n_1/2\Delta g$. The geophone-group-response function of array $C_2$ is given by $$R_2(f_g) = \frac{1}{n_2} \frac{\sin(2\pi f_g \Delta g)}{\sin\left(\frac{2\pi}{n_2} f_g \Delta g\right)} \qquad (14)$$

which has first-order zeros at $f_g = \frac{1}{2}\Delta g, 1/\Delta g, \ldots, (n_2-1)/2\overline{\Delta g}$ in the interval $0 \leq f_g \leq n_2/2\Delta g$. The array formed by convolving $C_1$ with $C_2$ will have a geophone-group-response function given by $$R_{12}(f_g) = R_1(f_g) R_2(f_g) = \frac{1}{n_1 n_2} \frac{\sin^2(2\pi f_g \Delta g)}{\sin\left(\frac{2\pi}{n_1} f_g \Delta g\right) \sin\left(\frac{2\pi}{n_2} f_g \Delta g\right)} \qquad (15)$$

If $n_1 < n_2$ are relatively prime integers, $R_{12}(f_g)$ will have first-order zeros at $f_g = k_1 n_1/2\Delta g$ and $k_2 n_2/2\Delta g$, where $k_1 = 1, 2, \ldots, (n_2-1)$, and $k_2 = 1, 2, \ldots, (n_1-1)$, in the interval $0 \leq f_g \leq n_1 n_2/2\Delta g$. All other zeros in this interval will be of second order. It will be noted that the geophone array in this example is a prime convolutionary array whose geophone-group-response function is zero at all of the early half-integral multiples of the reciprocal of the group interval. In view of this fact, it is apparent that this geophone array can be used in place of a geophone array having a geophone-group-response function having zeros at the early integral multiples of the reciprocal of the group interval and a mixer whose purpose is to cause the geophone-group-response function to become zero at the early odd-half-integral multiples of the reciprocal of the group interval. We therefore, refer to this new type of array as a self-sufficient prime convolutionary array.

Up to this point the present invention has been described in terms of geophone arrays and an inter-trace mixer which operates only on the traces of a single seismogram, or, what is also known in the art as a "-common-source-group gather." In addition to the use of geophone groups to attenuate coherent noise waves the prior art has given some recognition to the usefulness of source groups for this purpose. In view of the fact that a line of seismic data may be regarded as a function of the three independent variables $g$, $s$, and $t$, ($g$ being the distance coordinate along the line of geophone placement, $s$ the corresponding coordinate for the sources, and $t$, record time), we may regard the three-dimensional Fourier transform of the seismic line as a function of the three independent frequency variables $f_g$, $f_s$, and $f_t$. Thus far we have discussed the attenuation of coherent noise energy corresponding to values of $f_g$ such that $|f_g| \geq \frac{1}{2}\Delta g$. It is apparent that we may also have a means of attenuating those portions of coherent noise waves corresponding to spatial frequencies $f_s$ such that $|f_s| \geq \frac{1}{2}\Delta s$, where $\Delta s$ is the previously defined source group interval. It is a part of the method of the present invention to design and use source groups that are analogous to the geophone groups previously described. In particular, it is desirable to use a source group whose source-group-response-versus spatial-frequency function (or simply, source-group-response function), $$P(f_s) = \left[\sum_{m=-M}^{M} S_m \cos(2\pi f_s s_m)\right] \bigg/ \left[\sum_{m=-M}^{M} S_m\right] \qquad (16)$$

has zeros at $f_s = k/\Delta s, k = \pm 2, \ldots, \pm k_{max}$. In Equation (16) $S_m$ is the strength of the $m^{th}$ individual source in the group and $s_m$ is its location with respect to the source group center. It is desirable to require that $S_{-m} = S_m$ and $s_{-m} = s_m$. The number of sources in the array is $2M$ if $S_0 = 0$, and $2M+1$ otherwise.

Figure 5B:
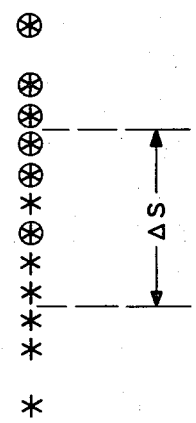
FIG. 5B is a representation of seismic source groups, derived by convolution, in which the center-to-center spacing, or source group interval, is $\Delta s$.

FIG. 5B illustrates a simple example of a prime convolutioanry source group of six sources of equal strength. Two adjacent, interlocking source arrays are shown in the diagram to illustrate the meaning of $\Delta s$, which for this example was chosen to be equal to $\Delta g$, but this is not a general requirement. Just as it is considered important for $R(f_g)$ to have second-or higher-order zeros at the early integral multiples of $1/\Delta g$, it is also considered important that $P(f_s)$ have second- or higher-order zeros at the early integral multiples of $1/\Delta s$.

In complete analogy to the inter-trace mix among the traces of common source gather, described above, the method of the present invention contemplates a mix among the traces of a "common geophone-group gather" in order further to attenuate high spatial frequency components of the seismic data that would cause aliasing effects in the integral $f_s < \frac{1}{2}\Delta s$.

Figure 7:
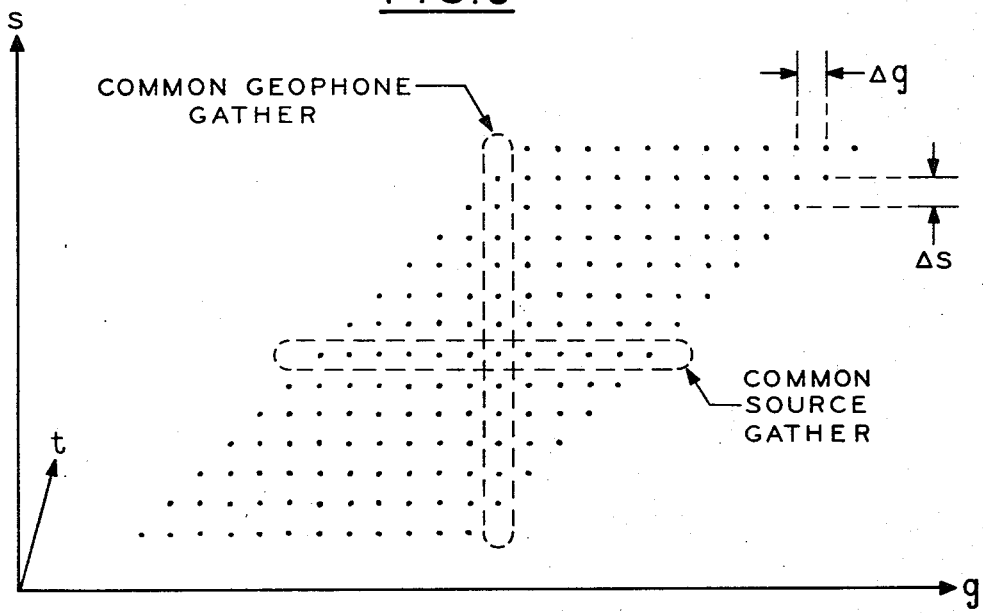
FIG. 7 is a geophone-source plot, useful in explaining the gathering of individual traces to make either common source gathers or common geophone gathers. Each dot represents one time trace, time, $t$, is represented as being in a direction perpendicular to the plane of FIG. 7.

FIG. 7 is a diagram that is useful in describing the layout of seismic spreads and in discussing certain aspects of seismic data processing. Each point on the diagram has an $s$-coordinate corresponding to the location of the center of the source group giving rise to a trace corresponding to the point. The same point has a $g$-coordinate corresponding to the location of the center of the geophone group whose output is the trace in question. In other words, the diagram is a plot of the $s$- and $g$-coordinates of all of the traces comprising a seismic line. The location of the origin of the seismic line on the diagram is at $g = s = 0$. The example shown in FIG. 7 is a seismic line consisting of 14 12-trace seismograms, or common source-group gathers, which were recorded with an end-on layout geometry, with $\Delta s = \Delta g$. The offset of the source group center from the near geophone array center for any seismogram on the diagram is $2\Delta g$.

Returning now to the description of the inter-trace mix among the traces of a common-geophone-group gather, it should be apparent from FIG. 7 what is intended. All those traces having the same $g$-coordinate are to be processed by an intertrace mixer whose spatial frequency transfer function has zeros at all odd-half-integral multiples of $1/\Delta s$. In this way high spatial frequency components in the interval $f_s < \frac{1}{2}\Delta s$ will be subjected to an attenuation beyond that provided by the use of source arrays. The mathematical characteristics of this mixer are identical to those of the previously described mixer for mixing traces of a common-source-group gather. The implementation is necessarily more restricted since it is not possible to mix traces from different seismograms in "real time." The mixing must be performed at some later time, preferable, using a digital computer.

As in the case of geophone array design, it is possible to design source arrays having source-group-response functions that are zero at all the early half-integral multiples of the reciprocal of the source group interval, thus eliminating the need for mixing the traces of the common-geophone-group gathers at a later time. An example of such an array is the self-sufficient prime convolutionary geophone array, previously described, with the equally-sensitive geophones replaced with sources of equal strength.

DESIGN OF GEOPHONE GROUPS

ACCORDING TO THE PRESENT INVENTION

From the above considerations it will be apparent that improved geophone arrays for field use can be designed in the following manner:

As in customary practice, the first quantity to be specified is the distance between successive group centers, $\Delta g$. Experienced geophysicists pick this distance on the bases of both practical necessity (available money, field equipment, and processing facilities) and indicated geologic necessity. The more pronounced are the suspected dips of the geologic formations, the smaller must be $\Delta g$. Distances of 50 to 400 feet are representative of present practice. After $\Delta g$ is specified, the distances between the geophones within each array need to be specified; and the simplest way (but not the best way) to do this according to the present invention is to space the geophones uniformly with an interval $\Delta e = \Delta g/m$ where $m$ is the number of geophones in the group. This will cause the spatial frequency transfer function (the group response-versus-spatial-frequency function) to have zeros at all the early non-zero integral multiples of the reciprocal of the distance, $\Delta g$, between group centers, in accordance with the teachings of the previous section. However the zeros for the simple, uniformly spaced geophone group will be only first order zeros, and further improvement can be obtained with second and higher order zeros. So, in accordance with the teachings of the previous section, better arrays can be designed by convolving pairs, triplets, quadruplets, or higher ordered sets, of simple uniformly spaced arrays. The order of at least some of the zeros of the transfer function of the resulting geophone group will then be equal to the number of simple uniformly spaced arrays entering into the convolution.

In accordance with the previously given theory, if two simple uniformly spaced arrays are to be convolved, one having m elements (geophones) and the other having n elements, the original element-to-element spacings of those simple arrays should be $\Delta g/m$ and $\Delta g/n$ respectively.

In the convolved array of FIG. 4A, which has already been described in the preceding section, the quantities $\Delta g/m$ and $\Delta g/n$ must be $60/2 = 30$ and $60/3 = 20$ respectively. The convolved array must then have geophones at the positions:

$\pm(\frac{1}{2})(60/2) = +15$ ft
$= -15$ ft
$\pm(\frac{1}{2})(60/2)\pm(60/3) = +15 + 20 = +35$ ft
$= -15 + 20 = + 5$ ft
$= +15 - 20 = - 5$ ft
$= -15 - 20 = -35$ ft and these are the positions shown in FIG. 4A. The arithmetic procedures for designing other convolved arrays are quite analogous.

AN EMBODIMENT OF THE PRESENT INVENTION

IN A FIELD SYSTEM

Reference is now made again to FIG. 1 in which a seismic wave detecting and recording system is shown in schematic form, with the seismic source and detecting elements spaced in accordance with the present invention, so that seismic wave energy which would ordinarily alias back into the desired lower spatial frequencies, can be effectively excluded from the recorded waves.

Geophone groups of the sort already described in connection with FIG. 4A are shown in FIG. 1, interdigited with their neighboring geophone groups. The groups in FIG. 1 are shaded alternately black and white to show clearly which geophones belong to each group. This brings out one of the most interesting features of prime convolutionary groups. The geophones of each group overlap the geophones of its neighboring group in just such a manner that a uniformly-spaced set of locations is completely filled, each with one geophone (and only one). The relatively simple, 2*3 prime convolutionary groups shown in FIG. 1 have overlaps consisting of only one geophone apiece from each of two neighboring groups; higher-ordered prime convolutionary groups have complicated overlap sequences.

In the upper left hand portion of FIG. 1, the diagram is intended to indicate how the geophone positions could have been derived by convolutions of 2-element and 3-element component arrays. Dots $10a$ and $11a$ represent component arrays of m elements whose element-to-element spacing is $\Delta g/m$. Dots $10b$ and $11b$ represent component arrays of $n$ elements whose element-to-element spacing is $\Delta g/n$. In the convolution operation, for each element position $10a$ or $11a$, there is substituted a group of element positions $10b$ or $11b$ respectively. With the particular arrays shown for each original component array of two positions, there results an array having six positions. The respective positions, obtained by convolution are indicated by the dashed liner leading to the final geophone positions, 10 and 11.

The common electrical leads, such as $10c$ and $11c$ are shown connected at center positions of the geophone groups.

Geophones 10 and 11 along the line of survey are actuated by seismic waves generated by a seismic source 14, which in the represented schematic embodiment is shown as an eccentric weight 12 mounted for rotation on a base 13 by a prime mover, such as electric motor 16. Control of the rate of vibration is through the speed of motor 16, by controller 18.

As indicated in phantom, the spacing $\Delta s$ between succeeding sources along horizontal coordinate $s$ is the same as the geophone group center spacing, $\Delta g$, along the horizontal coordinate $g$.

The leads from the geophone groups in FIG. 1 go to mixing circuits 20, 21, and 22, whose components are symbolized here as operational amplifiers, although as mentioned hereinbefore, the mixers may be passive resistive networks. The outputs of the mixers go through leads 25, directly, or indirectly through other amplifiers not shown, to recording heads 27 to generate traces on record 30 driven in time synchronism by motor 32. In actual present practice, the leads 25 may go into a unit which records digital signals directly on magnetic tape.

As explained in the foregoing parts of this specification, the overall purpose of an entire system, such as that represented in FIG. 1 is to avoid the recording of certain sets of spatial frequencies, which are the half-integer multiples of the reciprocal of the geophone group interval, and the half-integer multiples of the reciprocal of the source (group) interval spacing.

ACTUAL DATA SHOWING IMPROVEMENT ACHIEVABLE BY PRESENT INVENTION

Figure 8:
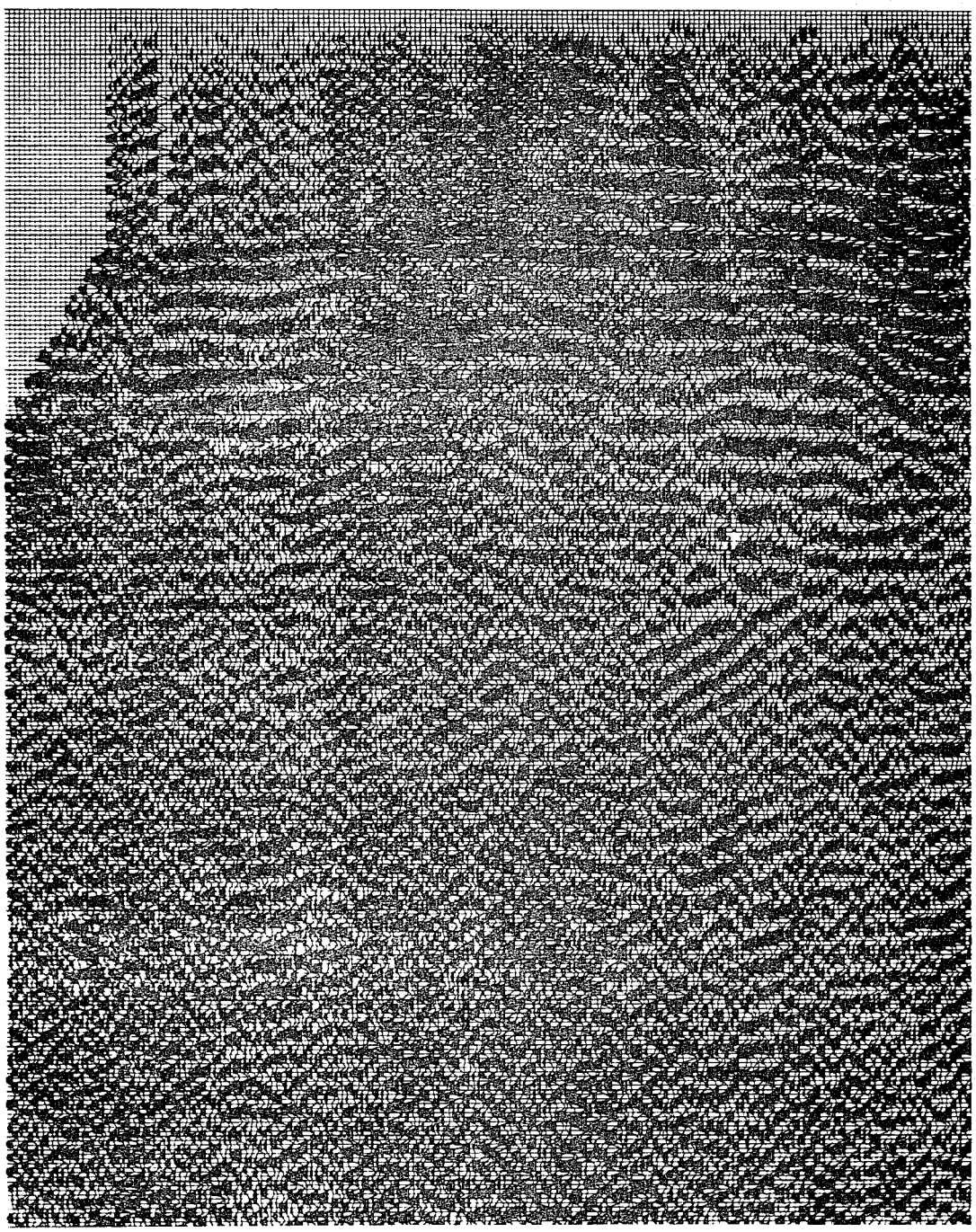
FIG. 8 is a portion of a field record recorded with conventional geophone groupings typical of the prior art.
Figure 9:
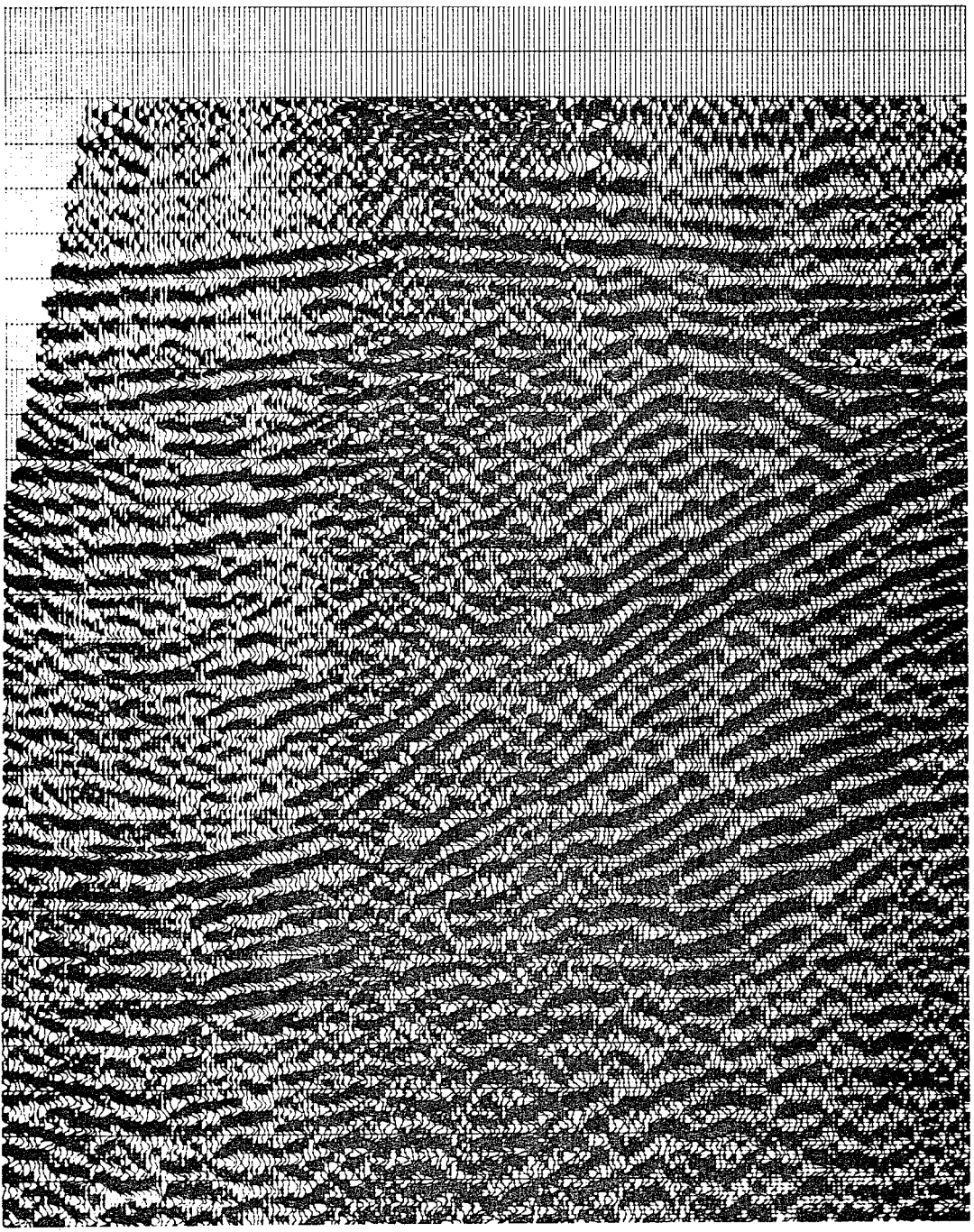
FIG. 9 is a portion of a field record of the same seismic line represented in FIG. 8, with data collected and processed in accordance with the present invention.

In order to show the kind of improvement in seismic records that can be achieved using the method of the present invention, FIGS. 8 and 9 are presented.

FIG. 8 is a stacked time section produced by conventional recording and computer-processing methods. The sources used were of the nonexplosive surface type and the equivalent source array was a linear set of 21 sources spaced at an interval of 13 ft with relative strengths in the ratio 1,2,4,6,7,8,8,8,8,8,8,8,8,8,8,7,6,4,2,1. The equivalent geophone array was a set of 20 detectors spaced at an interval of 13 ft with relative sensitivities in the ratio 1,1,1,1,2,2,2,2,3,3,3,3,2,2,2,2,1,1,1,1. In field practice, such a geophone array is realized by placing one, two, or three equally sensitive geophones at the detector locations requiring multiple sensitivity. The source group interval was equal to twice the geophone group interval ($\Delta s = 312$ ft, $\Delta g = 156$ ft).

FIG. 9 is a stacked time section produced by the method of the present invention. The seismic survey line was the same as that for FIG. 8. The source used was again of the nonexplosive surface type and the equivalent source array was a 3*11 prime convolutionary array. The geophone array was a 4*9 prime convolutionary array. A 1:4:6:4:1 field-binomial-mix was applied to the traces of the common-source-group-gathers and a 1:2:1 computer-binomial-mix was applied to the traces of the common-geophone-group-gathers. The source group interval was equal to the geophone group interval ($\Delta s = \Delta g = 165$ ft).

The remarkable superiority of FIG. 9 to FIG. 8, in depicting subsurface stratal configurations, is immediately obvious upon inspection; and the comparison illustrates representatively the superiority of the method of the present invention to conventional methods.

SUMMARY

In summary, the method of the present invention effectively solves the problem of alias energy due to improper or inadequate sampling of the seismic waves resulting in higher spatial frequencies from surface waves or noise being recorded as lower spatial frequencies from seismic reflections. As particularly distinguished from previously proposed solutions to this problem, either using an uneconomic or impractical number of sources or geophones, or attempting to suppress all frequencies above a given passband of useful seismic frequencies, it will now be understood, in accordance with the teachings of this application, that correct placement of seismic elements (sources, and/or geophones) within their respective groups, causes the group response to be controlled so that just the right set of narrow frequency bands in the spatial frequency spectrum is effectively excluded from the recorded and processed seismic waves.

While various modifications in apparatus and procedure will become apparent from the foregoing description, all such modifications coming within the scope of the claims are intended to be included.

I claim:

1. In a method of seismic geophysical prospecting, which includes generating seismic waves by seismic energy sources horizontally spaced along a line of survey, and detecting subsequent reflections of the generated seismic waves from subsurface strata, by a plurality of groups of geophones horizontally spaced along said line of survey adjacent the surface of the earth, each group of geophones producing a seismic trace to be displayed with other traces, side-by-side, to form a seismic record, in which method the prior art attempted to suppress broad bands of undesired, higher spatial frequencies, to minimize the interfering effects of spatial frequencies above the desired pass band, the improvement of more effectively suppressing only those particular spatial frequencies that would "alias" back into said desired pass band, which comprises positioning at least one of the two kinds of seismic elements, consisting of geophones and seismic sources, so that their respective group-response-versus-spatial-frequency functions suppress the aliasing frequencies, by performing the following steps:

a. placing a plurality of individual geophones within each of said geophone groups at horizontal positions, denoted in terms of the horizontal coordinate, $g$, along said line of survey, said positions being the convolved positions from within two uniformly spaced component arrays, the first array having $m$ geophone positions and the second array having $n$ geophone positions, where $m$ and $n$ are integers, and the individual, uniform, geophone-to-geophone spacings in said first component array and said second component array, are respectively, $\Delta g/m$ and $\Delta g/n$, where $\Delta g$ is the distance between successive geophone group centers along said line of survey, b. placing individual sources at a plurality of horizontal positions denoted in terms of the horizontal coordinate $s$, along said line of survey, the distance between individual sources, $\Delta s$, being equal to $\Delta g$, c. energizing at least one of said sources, and d. adding the traces from at least one set of three neighboring geophone groups that have received waves caused by a common source, using binomial weighting, the central trace being given a weight twice that of each of the two adjacent traces so that the effective geophone group-response-versus-spatial-frequency function is substantially zero at the half-integral multiples of $1/\Delta g$.

2. In a method of seismic geophysical prospecting, which includes generating seismic waves by seismic energy sources horizontally spaced along a line of survey, and detecting subsequent reflections of the generated seismic waves from subsurface strata, by a plurality of groups of geophones horizontally spaced along said line of survey adjacent the surface of the earth, each group of geophones producing a seismic trace to be displayed with other traces, side-by-side, to form a seismic record, in which method the prior art attempted to suppress broad bands of undesired, higher spacial frequencies, to minimize the interfering effects of spatial frequencies above the desired pass band, the improvement of more effectively suppressing only those particular spatial frequencies that would "alias" back into said desired pass band, which comprises positioning at least one of the two kinds of seismic elements, consisting of geophones and seismic sources, so that their respective group-response-versus-spatial-frequency functions suppress the aliasing frequencies, by performing the following steps:

a. placing a plurality of individual sources within each of a set of source groups at horizontal positions, denoted in terms of the horizontal coordinate, $s$, along said line of survey, said positions within each group being the convolved positions from within two uniformly spaced component arrays, the first array having $p$ source positions and the second array having $q$ source positions, where $p$ and $q$ are integers, and the individual, uniform, source-to-source spacings in said first component array and said second component array, are respectively, $\Delta s/p$ and $\Delta s/q$, where $\Delta s$ is the distance between successive source group centers along said line of survey, b. placing a plurality of individual geophones within each of said geophone groups at horizontal positions, denoted in terms of the horizontal coordinate, $g$, along said line of survey, said positions being the convolved positions from within two uniformly spaced component arrays, the first array having $m$ geophone positions and the second array having n geophone positions, where $m$ and $n$ are integers, and the individual, uniform, geophone-to-geophone spacings in said first component array and said second component array, are respectively, $\Delta g/m$ and $\Delta g/n$, where $\Delta g$ is the distance between successive geophone group centers along said line of survey, and $\Delta g = \Delta s$, c. energizing separately and sequentially at least three neighboring ones of said source groups, d. adding the traces from at least one set of three neighboring geophone groups that have received waves caused by a common source group, using binomial weighting, the central trace being given a weight twice that of each of the two adjacent traces, and e. adding at least one set of three traces that have been received by one geophone group from the actuation of three neighboring source groups, using binomial weighting, the central trace being given a weight twice that of each of the two adjacent traces so that both the effective source-group-response-versus-spatial-frequency function and the effective geophone-group-response-versus-spatial-frequency function are substantially zero at the half-integral multiples of $1/\Delta s = 1/\Delta g$.

3. In a method of seismic geophysical prospecting, which includes generating seismic waves by seismic energy sources horizontally spaced along a line of survey, and detecting subsequent reflections of the generated seismic waves from subsurface strata, by a plurality of groups of geophones horizontally spaced along said line of survey adjacent the surface of the earth, each group of geophones producing a seismic trace to be displayed with other traces, side-by-side, to form a seismic record, in which method the prior art attempted to suppress broad bands of undesired, higher spatial frequencies, to minimize the interfering effects of spatial frequencies above the desired pass band, the improvement of more effectively suppressing only those particular spatial frequencies that would "alias" back into said desired pass band, which comprises positioning at least one of two kinds of seismic elements, consisting of geophones and seismic sources, so that their respective group-response-versus-spatial-frequency functions suppress the aliasing frequencies, by performing the following steps:

a. positioning pluralities of one of said kinds of seismic elements in groups along said line of survey so that the horizontal interval between the centers of adjacent groups is $\Delta e$, b. positioning the individual elements of said one kind of seismic element within its respective group so that the respective group-response-versus-spatial-frequency function becomes substantially zero at the early, integral multiples of $1/\Delta e$, c. mixing seismic traces from near neighboring groups of said one kind of seismic element and a common single group of said other kinds of seismic elements, so that the effective said respective group-response-versus-spatial-frequency function becomes substantially zero also at the odd, half-integral multiples of $1/\Delta e$.

4. The method of claim 3 in which said one of said kinds of seismic elements is a geophone and said other of said kinds of seismic elements is a source.

5. The method of claim 3 in which said one of said kinds of seismic elements is a source and the other of said kinds of seismic elements is a geophone.

6. In a method of seismic geophysical prospecting, which includes generating seismic waves by seismic energy sources horizontally spaced along a line of survey, and detecting subsequent reflections of the generated seismic waves from subsurface strata, by a plurality of groups of geophones horizontally spaced along said line of survey adjacent the surface of the earth, each group of geophones producing a seismic trace to be displayed with other traces, side-by-side, to form a seismic record, in which method the prior art attempted to suppress broad bands of undesired, higher spatial frequencies, to minimize the interfering effects of spatial frequencies above the desired pass band, the improvement of more effectively suppressing only those particular spatial frequencies that would "alias" back into said desired pass band, which comprises positioning at least one of two kinds of seismic elements, consisting of geophones and seismic sources, so that their respective group-response-versus-spatial-frequency functions suppress the aliasing frequencies, by performing the following steps:

a. positioning pluralities of one of said kinds of seismic elements in groups along said line of survey so that the horizontal interval between the centers of adjacent groups is $\Delta e$, b. positioning the individual elements of said one kind of seismic element within its respective group so that the respective group-response-versus-spatial-frequency function becomes substantially zero at all the early half-integral multiples of $1/\Delta e$.

7. The method of claim 6 in which said one of said kinds of seismic elements is a geophone.

8. The method of claim 6 in which said one of said kinds of seismic elements is a source.

9. The method of claim 4 with the additional step of positioning pluralities of sources in groups along said line of survey, the individual sources within the source groups being positioned so that the source group-response-versus-spatial-frequency function becomes substantially zero at the early integral multiples of $1/\Delta s$, the reciprocal of the source group interval.

10. The method of claim 4 with the additional step of mixing seismic traces from adjacent source groups and a common geophone group in a binomial mix, so that the effective source group-response-versus-spatial-frequency function becomes substantially zero at the odd, half-integral multiples of $1/\Delta s$, the reciprocal of the source group interval.

11. The method of claim 7 with the additional step of positioning pluralities of sources in groups along said line of survey, the individual sources within the source groups being positioned so that the source group-response-versus-spatial-frequency function becomes substantially zero at the early integral multiples of $1/\Delta s$, the reciprocal of the source group interval.

12. The method of claim 7 with the additional step of mixing seismic traces from adjacent source groups and a common geophone group in a binomial mix, so that the effective source group-response-versus-spatial-frequency function becomes substantially zero at the odd, half-integral multiples of $1/\Delta s$, the reciprocal of the source group interval.

13. The method of claim 5 with additional step of positioning pluralities of geophones in groups along said line of survey, the individual geophones within the geophone groups being positioned so that the geophone group-response-versus-spatial-frequency function becomes substantially zero at the early integral multiples of $1/\Delta g$, the reciprocal of the geophone group interval.

14. The method of claim 5 with the additional step of mixing seismic traces from adjacent geophone groups and a common source group in a binomial mix, so that the effective geophone group-response-versus-spatial-frequency function becomes substantially zero at the odd, half-integral multiples of $1/\Delta g$, the reciprocal of the geophone group interval.

15. The method of claim 8 with the additional step of positioning pluralities of geophones in groups along said line of survey, the individual geophones within the geophone groups being positioned so that the geophone group-response-versus-spatial-frequency function becomes substantially zero at the early integral multiples of $1/\Delta g$, the reciprocal of the geophone group interval.

16. The method of claim 8 with the additional step of mixing seismic traces from adjacent geophone groups and a common source group in a binomial mix, so that the effective geophone group-response-versus-spatial-frequency function becomes substantially zero at the odd, half-integral multiples of $1/\Delta g$, the reciprocal of the geophone group interval.

* * * * *